United States Patent [19]

Jaffe

[11] 4,455,173

[45] Jun. 19, 1984

[54] PREPARATION OF PIGMENTARY FORM OF QUINACRIDONE PIGMENTS

[75] Inventor: Edward E. Jaffe, Wilmington, Del.

[73] Assignee: E. I. Du Pont De Nemours and Company, Wilmington, Del.

[21] Appl. No.: 368,321

[22] Filed: Apr. 16, 1982

Related U.S. Application Data

[63] Continuation-in-part of Ser. No. 281,194, Jul. 7, 1981 abandoned.

[51] Int. Cl.$^3$ .............................................. C09B 48/00
[52] U.S. Cl. ................................ 106/288 Q; 106/309; 546/56; 546/57
[58] Field of Search .......................... 546/49, 56, 57; 106/288 Q, 309

[56] References Cited

U.S. PATENT DOCUMENTS

| | | | |
|---|---|---|---|
| 2,857,400 | 10/1958 | Cooper | 260/246 |
| 3,017,414 | 1/1962 | Minnich et al. | 260/279 |
| 3,030,370 | 4/1962 | Jackson | 546/56 X |
| 3,287,147 | 11/1966 | Wilkinson | 106/288 |
| 3,364,300 | 8/1966 | Keily et al. | 546/56 |
| 4,094,699 | 6/1978 | Fitzgerald | 106/288 |
| 4,212,975 | 7/1980 | Kroh et al. | 546/49 |
| 4,371,643 | 1/1983 | Thomas | 106/288 Q X |

FOREIGN PATENT DOCUMENTS

| | | |
|---|---|---|
| 1225598 | 9/1966 | Fed. Rep. of Germany . |
| 50-71736 | 6/1975 | Japan . |
| 900757 | 7/1962 | United Kingdom . |
| 1240278 | 7/1971 | United Kingdom . |

*Primary Examiner*—Donald G. Daus
*Assistant Examiner*—Diana G. Rivers

[57] ABSTRACT

Pigmentary grade quinacridone pigments are prepared from crude quinacridone by conversion to aggregated low crystallinity quinacridones followed by milling the aggregated low crystallinity quinacridone in the presence of a liquid which wets the pigment and can improve the crystallinity of quinacridone at 10° to 60° C. Suitable quinacridones include

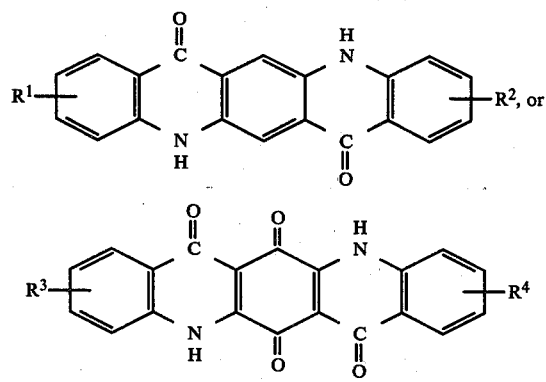

and mixtures thereof with up to 15 wt. % of

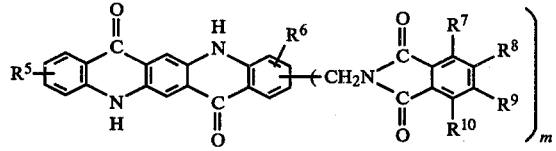

where $R^1$, $R^2$, $R^3$, $R^4$, $R^5$ $R^6$ are hydrogen, fluorine, chlorine, bromine, methyl or methoxy; $R^7$, $R^9$ and $R^{10}$ are hydrogen or chlorine; and $R^8$ is hydrogen, chlorine, bromine, nitro, alkyl groups of 1 to 5 carbon atoms, alkoxy groups of 1 or 2 carbon atoms or benzoylamino, and m is an integer of from 1 to 4.

11 Claims, No Drawings

PREPARATION OF PIGMENTARY FORM OF QUINACRIDONE PIGMENTS

CROSS-REFERENCE TO RELATED APPLICATION

This application is a continuation-in-part of Ser. No. 281,194 filed July 7, 1981 now abandoned.

BACKGROUND OF THE INVENTION

1. Field of the Invention

The present invention relates to a process for converting crude quinacridones to an aggregated low crystallinity form followed by conversion to a pigmentary form in the presence of a recoverable organic liquid.

It is well known in the art that quinacridones as synthesized, known as crude quinacridones, are generally unsuitable for use as pigments and must be further processed to develop the requisite pigmentary properties such as particle size, particle shape, crystalline structure, tinctorial strength, phase etc. The most commonly used processes for converting crude quinacridones to pigmentary form involve milling the crude quinacridone with large quantities of inorganic salt and then extracting the resulting mill powder. While the salt grinding process produces satisfactory pigment for some applications, it suffers from two important disadvantages. First it involves the use of large quantities of salt which severely limits the amount of pigment which can be charged to the mill and which has to be disposed of and second the resulting pigment particles often are acicular which creates rheological problems in final applications such as high solids acrylic paints for automotive use.

2. Prior Art

Various attempts to eliminate the use of salt in milling crude quinacridones have been made. For instance in U.S. Pat. No. 2,857,400 crude pigment is premilled in a ball mill, then homogenized in acetone and recovered from the acetone. In U.S. Pat. No. 3,017,414 crude pigment is premilled in a ball mill, then treated with an organic liquid such as chlorobenzene in water emulsion, and recovered from the emulsion. Like the salt, disposal of the organic liquid creates a problem.

Another method for preparing pigmentary quinacridone from crude quinacridone, is described in U.S. Pat. No. 3,287,147 wherein the crude quinacridone is either acid pasted or ball milled to provide a product which is formed into a neutral aqueous paste which is then heated at 150° to 300° C. under pressure. Special equipment is required for heating at elevated temperatures and pressure.

In still another method (U.S. Pat. No. 4,094,699) which dispenses with the use of organic solvents premilled quinacridone is ripened in an aqueous base in the presence of both cationic and nonionic surfactants. Some of the surfactants are retained on the surface of the pigment and can cause compatibility problems in some end-use systems.

SUMMARY OF THE INVENTION

The present invention involves converting a crude quinacridone to an aggregated low crystallinity form followed by milling the resulting material in the presence of an organic liquid to convert the aggregated low crystallinity quinacridone to a readily dispersible pigmentary quinacridone.

DETAILED DESCRIPTION

The method of the present invention affords the opportunity to provide quinacridone pigments of essentially any desired particle size and thus control one of the parameters which affect the rheological properties of the product pigment by the exclusion or inclusion of particle size growth inhibitors. The inclusion of 2-phthalimidomethylquinacridone in even small quantities has a profound effect on the particle size of the resulting product. This particle size growth inhibitor can be included in the liquid milling step or in the earlier step of premilling. The efficiency of growth inhibiting action is enhanced when it is included in the premilling operation.

Particle size control of solid solution quinacridone pigments is difficult in the prior art dispersion milling process as described in U.S. Pat. No. 3,030,370, since it is dependent on the ripening and extraction step in dilute sulfuric acid which is relatively ineffective in growing the particles from low crystallinity material generated in a long and effective dispersion milling step. Undermilling cannot be used to correct this, since it leads to products exhibiting incomplete solid solution formation. Under conditions of the present invention, complete solid solution is usually achieved at various levels of particle sizes of the final pigmentary product. The process of the present invention can provide the variables required to obtain a desired particle size pigment over a wide range of particle sizes either by inclusion of a particle size growth restraining agent or by modifying the organic liquid used so as to control its effect on the particular quinacridone being used. Thus the process of the present invention can be used to prepare relatively large particle size pigments which still have the high tinctorial strength usually associated with small particle size pigments but which exhibit excellent lightfastness usually associated with the larger particle size pigments.

Another advantage of the present invention is that it avoids the need to use surfactants which interfere with some end use applications.

In a preferred aspect of the present invention the ingredients intended to become part of the final pigment, whether a single quinacridone component or a binary, tertiary or even quaternary solid solution are coground in a conventional ball mill, along with about 8 to 10%, based on the pigment, of an inorganic salt such as sodium sulfate to avoid possible explosivity of the generated mill powder, and the material ground to an aggregated low crystallinity material. Addition of sodium sulfate is not essential since the product is highly aggregated and not dusty. The resulting mill powder is then milled in an easily recoverable organic liquid in the presence or absence of a particle size growth inhibitor.

Any organic liquid which has an effective wetting action on the pigment particles and can grow these particles from an aggregated low crystallinity material to pigmentary material is acceptable. In addition the organic liquid should be sufficiently volatile by either steam distillation or direct distillation and noncorrosive to the mill and grinding elements. A wide variety of organic liquids are suitable and the preferred organic liquid will vary with the nature of the pigment and its solubility.

Alcohols such as methanol and isopropanol, and ketones such as acetone and methyl ethyl ketone, hydrocarbons, and halogenated hydrocarbons such as carbon tetrachloride, tetrachloroethylene and o-dichlorobenzene can be used. The choice of organic liquid will be influenced by the specific pigment being manufactured as well as by the cost, ease of recovery and hazard of use of the organic liquid. Higher boiling liquids are generally more difficult and therefore more costly to recover by steam distillation. Other liquids such as certain chlorinated hydrocarbons are toxic and therefore undesirable. On the other hand, the low boiling liquids such as acetone tend to be flammable, although otherwise desirable because of their low cost, nontoxic nature and ease of distillation. Another advantage of acetone and the low boiling alcohols is that they are miscible with water and consequently their ability to grow pigment particles can be modified by dilution with water in the step of milling with an organic liquid, which dilution leads to products of smaller particle size.

The object of the invention is accomplished by first converting the crude quinacridone pigment to aggregated low crystallinity material. This can be done by milling the crude pigment or pigments in the dry state in a grinding apparatus which provides shearing and attrition, to an aggregated low crystallinity product.

Premilling, as used in this invention, means milling in the complete absence of liquids, or, if liquids are used, such as a phase directing solvent, or a surface active agent, they are present in such small amounts or of such a nature that the pigment retains the characteristics of a powder.

Alternatively an aggregated low crystallinity quinacridone pigment can be obtained by dissolving the crude quinacridone in concentrated sulfuric acid and drowning the solution into cold water. In either case the low crystallinity highly aggregated pigment is tinctorially weak by rubout and as such not valuable.

The preferred method for use in this invention involves ball milling of a crude quinacridone or mixture of quinacridones in a conventional manner in the dry state followed by ball milling of the mill powder in sufficient organic liquid to give a fluid slurry.

The quinacridone pigments to which the present invention is applicable generally will consist essentially of quinacridones of the formula I

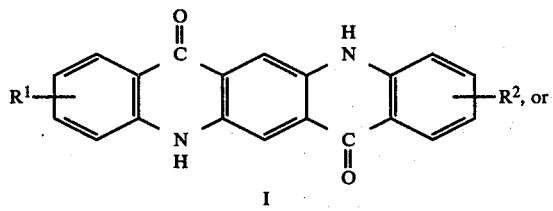

formula II

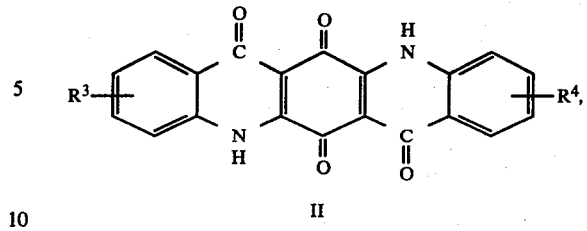

and mixtures thereof; and up to 15 wt. % but preferably up to 5% of a quinacridone of the formula III

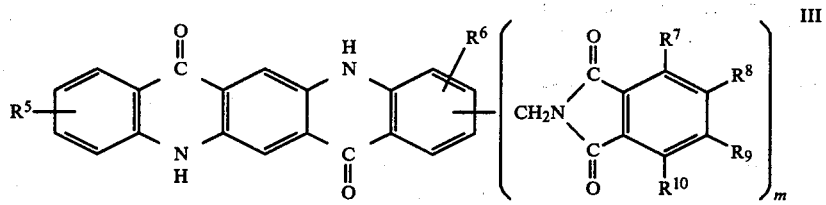

where $R^1$, $R^2$, $R^3$, $R^4$, $R^5$ and $R^6$, are hydrogen, fluorine, chlorine, bromine, methyl, or methoxy, $R^7$, $R^9$ and $R^{10}$, are hydrogen or chlorine, $R^8$ is hydrogen, chlorine bromine, nitro, alkyl groups of 1 to 5 carbon atoms, alkoxy groups of 1 or 2 carbon atoms or benzoylamino, and m is an integer of from 1 to 4. When using a quinacridone of formula I where $R^1$ and $R^2$ are —H which is relatively subject to considerable particle growth in an organic liquid such as acetone the pigment particles will become undesirably large causing the product pigment to become opaque and low in tinctorial strength. By incorporating as little as 2.0 wt. % of a quinacridone derivative of formula III with such a pigment, particle size growth is sufficiently inhibited to provide a product of attractive tinctorial characteristics.

The language "consisting essentially of" is not intended to exclude the presence of minor amounts of other materials such as dihydroquinacridone stabilizers etc., but is intended to exclude the presence of significant quantities of other materials which would detract from the pigmentary character of the quinacridone pigment.

It is impossible to set up limits as to the length of the liquid milling step since it will vary depending on the particular quinacridone or mixtures of quinacridones being treated, the mill loading, and the type of mill being used. In order to establish the optimum length of time for milling a particular pigment under a given set of conditions, it is recommended that the invention be run with variations in both milling times and that samples of the finished product be compared with standard samples exhibiting the desired degree of pigment quality. A minimum of 4–6 hours is usually required in a commercial size mill but this may be extended to as much as 12–18 hours or even more. Considerably longer times are required in laboratory scale or semi-works scale mills. Generally the liquid milling should be carried out at 10° to 60° C. with from 20° to 50° C. being preferred.

After the milling operation the quinacridone pigment normally is extracted in a hot dilute acid such as 1.5% sulfuric acid in order to remove any metal which has become associated with the pigment during milling. Following the extraction step the pigment is dried.

The pigment particles produced by the present invention generally have a plate-like shape whereas conventionally produced quinacridone pigments often are acicular in shape. The quinacridone pigments produced by the process of the present invention are much more dispersible than conventional quinacridone pigment and due to their plate-like shape and the ability to control particle size, pigments produced by the process of the present invention have improved rheological properties when compared with previous quinacridone pigments. This is most evident in solid color stylings in the new high solids thermosetting acrylic enamels which have been developed for automotive use. Most of the previous quinacridone pigments are virtually unusable in these systems, because of high viscosity, in contrast, the quinacridone pigments prepared by the present invention are useful in these systems. The products also exhibit improved rheological properties in conventional thermosetting and thermoplastic systems.

In the past it has been difficult to obtain a satisfactory 2,9-dichloroquinacridone pigment or its solid solution with quinacridone for use in solid color stylings in high solids enamels. By using the present invention satisfactory pigments of the 75% 2,9-dichloroquinacridone and 25% quinacridone solid solution or the 100% dichloroquinacridone are readily prepared for the new high solid enamels. An attractive 2,9-dimethylquinacridone pigment or its solid solution with quinacridone can similarly be prepared.

The introduction of a particle size growth inhibitor leads to products of smaller particle size and if properly dispersed in an automotive topcoat either a thermosetting enamel or thermoplastic lacquer, to a finish of increased intensity and geometric metamerism (commonly called "two-tone" effect or "flip-flop"). This latter property is of particular esthetic value and manifests itself as a change in color depth and often hue as a function of viewing angle. The effect may be observed by slowly rotating a flat paint panel covered with a metallic finish from a normal to an obtuse angle. With increasing "two-tone" the color increases in depth as the viewing angle changes in any direction from normal. The greater "two-tone" effect observed with product particles ripened in the presence of 2-phthalimidomethylquinacridone is due to the generation of smaller particle size pigment which when properly dispersed exhibit less light scattering and increased "two-tone" effect. The greater degree of "two-tone" which is achieved with pigments prepared by the present process indicates that they have an effective smaller particle size, which is also confirmed by x-ray measurements than products containing no pigment growth inhibitor or a lesser amount of the pigment growth inhibitor.

The resulting products treated with aluminum quinacridone sulfonate result in pigments of considerable "two-tone" and consequent esthetic appearance in conjunction with greatly improved rheological properties in thermosetting acrylic enamel systems.

DESCRIPTION OF THE PREFERRED EMBODIMENTS

In the following Examples all parts are by weight.

EXAMPLE I

Two laboratory scale ball mills are each charged with 1500 parts of steel balls, ½" (0.0127 m) in diameter, 150 parts of roofing nails, 45 parts 2,9-dimethylquinacridone, 5 parts quinacridone and 5 parts anhydrous sodium sulfate. The mill is rotated at about 74% of the "critical speed," (critical speed is the speed at which centrifugal force overcomes the force of gravity so that the grinding elements are retained against the outer wall of the mill) for 96 hours. The mills are opened and their contents discharged through a screen which retains the balls and nails.

Then a portion of the resulting mill powder (12 parts) is charged into each of four laboratory scale ball mills containing 600 parts ⅛" (0.00032 m) diameter steel shot and 79 parts acetone. The mills are rotated at about 74% of its critical speed for 72 hours. The mills are discharged onto a screen which retains the steel shot. The shot is washed with acetone so that essentially all of the pigment slurry is collected. Steam is passed through the slurry until the temperature reaches 95° C. After holding the temperature at 95° C. for 10 minutes all of the acetone is removed. The slurry is cooled to 85° C. and to it added 104 parts of 33% aqueous sulfuric acid. The slurry is maintained at 80° to 85° C. for one hour. The product is collected by filtration, washed acid free with water and dried at 80° C. to yield 43.2 parts pigment. When tested by rubout in a lithographic varnish the product is similar to a leading commercial 2,9-dimethylquinacridone in masstone and is at least 10% stronger in tinctorial strength.

This Example is repeated except that after the addition of 104 parts of 33% aqueous sulfuric acid the temperature is held at 80°–85° C. for one half hour and then 1.5 parts of 2-phthalimidomethylquinacridone is added as an aqueous dispersion and heating continued for another one half hour at 80°–85° C. The product is collected by filtration, washed acid free with water and dried at 80° C. The product exhibits particularly good rheological properties and unusually good tinctorial properties when tested in an automotive thermosetting enamel. The automotive millbase which is generated has a Ford Cup viscosity of 34 seconds whereas commercial 2,9-dimethylquinacridones have Ford Cup viscosities ranging from 44 to 61 seconds. This is a significant advantage in terms of handling the millbase and the appearance of the final automotive finish.

EXAMPLE II

This Example shows the effect on particle size of splitting the addition of 2-phthalimidomethylquinacridone by adding part in the acetone milling step.

A semi-works scale ball mill is charged with 1000 parts of "Cyl-Pebs", steel cylinders approximately ½"(0.0127 m) in diameter and ½" (0.0127 m) in length, 100 parts of "twenty penny", 4" (0.1 m) nails, 40 parts 2,9-dimethylquinacridone, and 4 parts anhydrous sodium sulfate. The mill is rotated at 40 rpm (about 74% of the critical speed) for 48 hours at 55° to 60° C. The mill is opened and its contents discharged through a screen which retains "Cyl-Pebs" and nails.

Then a portion of the resulting mill powder (0.029 part) is charged into each of two laboratory scale ball mills containing 1.32 parts ⅛" (0.00032 m) diameter steel shot, 0.00026 part 2-phthalimidomethylquinacridone, and 0.17 part acetone. The mill is rotated at about 74% of its critical speed for 72 hours. The mills are discharged onto a screen which retains the steel shot. The shot is washed with acetone so that essentially all of the pigment is collected as a slurry. Steam is passed through the slurry until the temperature reaches 95° C. After holding the temperature at 95° C. for 10 minutes all of the acetone is removed. The slurry is cooled to 85° C. and to it is added 0.11 part of 33% sulfuric acid. The slurry is maintained at 80° to 85° C. for one half hour and then treated with 0.00052 part of 2-phthalimidomethylquinacridone. Heating is continued for an additional half hour at 80° to 85° C. The product is collected by filtration, washed acid free with water and dried at 80° C. The product when evaluated by rubout in a lithographic varnish is significantly darker in masstone (smaller particle size) but just as strong in tint as a similar product treated with all of the 2-phthalimidomethylquinacridone additive in the extraction step only.

The product of small particle size affords metallic finishes of greater "two-tone" which is highly valued for automotive finishes.

EXAMPLE III

This Example illustrates the preparation of a 2,9-dichloroquinacridone solid solution pigment of outstanding rheology.

Three laboratory scale mills are charged with 1500 parts of ⅛" (0.0127 m) diameter steel balls, 150 parts roofing nails, 37.5 parts crude 2,9-dichloroquinacridone, 12.5 parts crude gamma quinacridone and 5 parts anhydrous sodium sulfate. The mills are rotated for 96 hours at approximately 75% of the critical speed. The balls and nails are separated with a screen and the dry mill powder is recovered. Another laboratory scale mill is charged with 4800 parts of ⅛" (0.00032 m) diameter steel shot, 120 parts of the mill powder from above, and 790 parts of acetone. The mill is rotated at about 75% of its critical speed for 72 hours. The mill is discharged on a screen which retains the steel shot. The steel shot is washed with additional acetone so as to collect essentially all of the pigment slurry from the mill. Steam is passed through the slurry until the temperature reaches 95° C. After holding the temperature at 95° C. for 10 minutes all of the acetone is removed and the steam is shut off. The slurry is cooled to 85° C. and to it is added 261 parts of 33% aqueous sulfuric acid and 24 parts of alum and the slurry heated at 80°-85° C. for one half hour. Then over a period of one half hour treated with an aqueous slurry containing 5 parts quinacridone monosulfonic acid to precipitate on the surface of the pigment 4.7% aluminum quinacridone sulfonate. Heating is continued for another one half hour at 80° to 85° C. The product is isolated by filtration, washed with hot water until free of acid, and dried. One hundred thirteen parts of the pigment are recovered.

Although the product has somewhat larger particle size than a commercial counterpart its rheological properties are far superior to what one would expect. The product is particularly suitable for high solids enamel systems where it displays unusually attractive rheological properties. Relative to a product of smaller particle size with a broader particle size distribution, the mill base shows a 4.3 fold decrease in viscosity when tested in an automotive high solids thermosetting enamel mill base. This advantage is of particular importance in styling solid reds for automotive topcoat finishes.

EXAMPLE IV

This Example illustrates a different way of obtaining aggregated low crystallinity quinacridone prior to milling in an organic liquid.

To 552 parts of concentrated sulfuric acid stirred at a temperature under 30° C. is added 37.5 parts of crude 2,9-dichloroquinacridone, and 12.5 parts of crude quinacridone. Since the material failed to go into solution 184 parts of 100% sulfuric acid is added while maintaining the temperature under 30° C. After stirring for 15 minutes all of the material went into solution. The resulting solution was added gradually over a period of one half hour to a stirred mixture of 2000 parts water and ice while maintaining the resulting slurry at 0°-10° C. The product was isolated by filtration and washed until acid free with water and dried. Forty-eight and one half parts of dry product are obtained.

The product is ball milled in acetone essentially as in Example III and the product obtained is virtually identical to the product obtained in Example III. Prior to acetone milling the product was weak and dull as compared with the final product,

EXAMPLE V

This Example illustrates the effect of 2-phthalimidomethylquinacridone on the particle size of the product described in Example III.

The dry premilling is carried out exactly as described in Example III.

The resulting mill powder is acetone milled in the presence of the 2-phthalimidomethylquinacridone in the following manner.

To a laboratory scale mill are charged 600 parts ⅛" (0.00032 m) steel shot, 13.2 parts of the mill powder from Example III, 0.24 part 2-phthalimidomethylquinacridone, and 79 parts acetone. The mill is rotated at about 75% of its critical speed for 72 hours. The acetone is distilled off with steam and the product is extracted with dilute aqueous sulfuric acid and treated with 4.3% of aluminum quinacridone sulfonate as described in Example III, Twelve parts of pigment are recovered. When compared by drawdown with the product of Example III in a lithographic varnish the masstone is significantly darker and thus smaller in particle size, but the tinctorial strength is identical to the product of Example III.

EXAMPLE VI

This Example illustrates the preparation of a 2,9-dimethylquinacridone solid solution pigment.

A laboratory scale mill is charged with 1500 parts of ⅛" (0.0127 m) diameter steel balls, 150 parts roofing nails, 37.5 parts crude gamma quinacridone, 12.5 parts crude 2,9-dimethylquinacridone, and 5 parts anhydrous sodium sulfate. The latter is added as a mill powder explosion suppressor but can be left out when operating on a laboratory scale. The mill is rotated at approximately 75% of the critical speed for 96 hours. The balls and nails are separated with a screen and the dry mill powder recovered.

A laboratory scale ball mill is charged with 600 parts of ⅛"(0.00032 m) diameter steel shot, 13.2 parts of the above mill powder and 79 parts acetone. The mill is rotated at about 75% of the critical speed for 72 hours. The mill is discharged on a screen which retains the steel shot. The steel shot is washed with acetone to collect essentially all of the pigment slurry from the mill. Steam is passed through the slurry until the temperature reaches 95° C. After holding the temperature at 95° C. for 10 minutes all of the acetone is removed and the steam is shut off. The slurry is cooled to 85° C., acidified with 26.1 parts of 33% aqueous sulfuric acid, maintained at about 85° C. for one hour, and the product isolated by filtration, followed by washing with water and drying.

The product is a relatively large particle size complete solid which shows outstanding heat stability in high density polyethylene, being significantly more heat stable than a product of identical composition but prepared by the dispersion milling technique. The dispersion milled product shows a significant blue shift at 500° F. (260° C.), while the product of the present example shows better heat stability at 600° F. (316° C.).

EXAMPLE VII

This Example illustrates the particle size altering effect of 2-phthalimoidomethylquinacridone when introduced into the acetone milling operation during the preparation of a quinacridone/2,9-dichloroquinacridone solid solution in which quinacridone is the major component.

A laboratory scale mill is charged with 1500 parts of $\frac{1}{2}''$ (0.0127 m) diameter steel balls, 150 parts roofing nails, 37.5 parts crude gamma quinacridone, 12.5 parts crude 2,9-dichloroquinacridone and 5 parts anhydrous sodium sulfate. The mill is rotated at approximately 75% of its critical speed for 96 hours. The balls and nails are separated with a screen and the dry mill powder recovered.

A laboratory scale ball mill is charged with 600 parts of $\frac{1}{8}''$ (0.00032 m) diameter steel shot, 13.2 parts of the above mill powder, 79 parts acetone and in a first run 0.48 part and in a second run 0.24 part 2-phthalimidomethylquinacridone. The mill is rotated at about 75% of its critical speed for 72 hours. The mill is discharged on a screen which retains the steel shot. The steel shot is washed with acetone to collect essentially all of the pigment slurry from the mill. Steam is passed through the slurry until the temperature reaches 95° C. After holding the temperature at 95° C. for 10 minutes all of the acetone is removed and the steam is shut off. The slurry is cooled to 85° C., acidified with 26.1 parts of 33% aqueous sulfuric acid, maintained at about 85° C. for one hour. Then over a period of one half hour treated with an aqueous slurry containing 0.5 part quinacridone monosulfonic acid to precipitate on the surface of the pigment 4.3% aluminum quinacridone sulfonate. Heating is continued for another one half hour at 80° to 85° C. The product is isolated by filtration, washed with hot water until free of acid and dried.

The resulting product containing 4% of the 2-phthalimidomethylquinacridone is considerably smaller in particle size than the product containing 2% of the 2-phthalimidomethylquinacridone. Although their tinctorial strengths in a thermosetting acrylic enamel are essentially the same they vary in "two-tone" effect in metallic finishes, the product containing 4% 2-phthalimidomethylquinacridone exhibiting greater "two-tone" and consequently more esthetic appeal. In addition the latter product exhibits substantially better rheology in a thermosetting enamel system when compared with a commercial product of similar color and "two-tone" effect.

EXAMPLE VIII

This Example illustrates the particle size altering effect of 2-phthalimidomethylquinacridone introduced into the acetone milling operation during the preparation of a quinacridone/2,9-dimethylquinacridone solid solution.

The dry premilling is carried out as reported in Example VI, but in one case 2% 2-phthalimidomethylquinacridone, and in another 4% of the additive, based on pigment charged, is added to the acetone milling operation. Every other step is carried out as reported in Example VI but in addition about 4.3% aluminum quinacridone sulfonate is precipitated on the pigment surface.

The resulting product containing 4% of the additive is considerably smaller in particle size than the product containing 2% of the additive, and the latter is smaller than the product devoid of additive. Although their strengths in lithographic varnish or thermosetting acrylic enamel are essentially the same, they vary in masstone. The darker the masstone the more desirable the product for use in metallized automotive finishes.

EXAMPLE IX

This Example illustrates the effect of 2-phthalimidomethylquinacridone introduced into the dry milling operation. The dry milling is carried out as reported in Example VI except in addition to the other ingredients 1.5 parts of 2-phthalimidomethylquinacridone is also charged to the mill prior to the dry milling step. The work up and surface treatment is exactly as reported in Example VII. The product is essentially identical to the product prepared in Example VI containing 4% 2-phthalimidomethylquinacridone.

EXAMPLE X

This Example illustrates the preparation of a gold solid solution pigment consisting primarily of quinacridonequinone.

The mill and milling media of Example V are used to comill 43.7 parts quinacridonequinone, 6.3 parts anilinoacridone, 0.1 part quinacridone and 5 parts anhydrous sodium sulfate. The conditions are those reported in Example VI. The resulting mill powder is milled in acetone and worked up as reported in Example VI except that the resulting product is kept as a presscake and then extended with 5% basic nickel carbonate by precipitation of the salt onto the pigment dispersed in water. The resulting solid solution product has a golden color and is a very close match in an automotive acrylic enamel prepared from the same ingredients by high turbulance acid drowning described in Ser. No. 153,208 filed May 27, 1980, now U.S. Pat. No. 4,286,998.

EXAMPLE XI

This Example illustrates the preparation of an orange solid solution quinacridone pigment.

The mill and milling procedure described in Example VII are used to comill 21 parts gamma quinacridone, 14.5 parts 4,11-dichloroquinacridone, 9.5 parts quinacridonequinone, 5.0 parts 6,13-dihydroquinacridone, and 5.0 parts anhydrous sodium sulfate. The dry milling conditions used are the same as reported in Example VII. The resulting mill powder is milled in acetone and worked up as shown in Example VII including the treatment with 4.3% aluminum quinacridone sulfonate.

The product is a close match to a commercial grade product of similar composition in terms of X-ray pattern and color except that the masstone is lighter as a consequence of larger particle size.

By including 3%, on a total pigment basis, of 2-phthalimidomethylquinacridone in the acetone milling step a product is obtained which closely approximates the commercial grade product is masstone depth but shows improved viscosity of a dispersion in a thermosetting acrylic enamel.

EXAMPLE XII

This Example illustrates the effect of varying the nature of the organic liquid on a 40/60 2,9-dimethylquinacridone/quinacridone solid solution pigment.

The mill and milling procedure described in Example VI are used to comill 30 parts crude gamma quinacridone, 20 parts crude 2,9-dimethylquinacridone, and 5 parts anhydrous sodium sulfate. The resulting mill powder is milled in an organic liquid as described in Example VI in three separate runs. The first run (a) uses acetone as the organic liquid, the second (b) uses methanol as the organic liquid and the third run (c) uses isopropanol as the organic liquid. The work up and surface treatment is the same as described in Example VII. The resulting products differ in particle size with (c) being the smallest in particle size and thus darkest and most transparent in masstone. Product (b) is intermediate in particle size and (a) is the largest in particles size and the lightest and most opaque in masstone. In tint all three products were essentially identical. Thus products of a variety of particle sizes can be obtained varying the organic liquid in the second milling operation.

EXAMPLE XIII

This Example illustrates the effect of water in conjunction with a water miscible organic liquid on particle size of the product described in Example XII.

Using the mill powder generated in the dry milling step of Example XII, milling in the organic liquids are performed according to the procedure of Example VII using:
(d) 100% acetone
(e) 78.5% acetone + 21.5% water
(f) 50% acetone + 50% water
(g) 100% isopropanol
(h) 50% isopropanol + 50% water The work up and surface treatment is the same as described in Example VII.

The resulting pigments are tested by rubout in a lithographic varnish which is a good approximation of what can be expected in some automotive finishes. Product (e) is somewhat darker and more transparent than (d) in masstone and (f) is considerably darker than (e) or (d). Product (h) is somewhat darker than (f) and (g). Thus particle size control can be exercised by diluting the organic liquid with water in the organic liquid milling operation.

EXAMPLE XIV

This Example illustrates the preparation of pigmentary unsubstituted quinacridone.

The mill and milling elements of Example VI are used to dry mill (1) 50 parts of gamma quinacridone and (m) 50 parts of beta-quinacridone both for 96 hours.

The thus generated mill powders are milled with an organic liquid using the procedure described in Example VI and worked up as reported in the same Example.
(n) 13.2 parts of (1)
(o) 13.2 parts of (1) + 2% 2-phthalimidomethylquinacridone
(p) 13.2 parts of (1) + 4% 2-phthalimidomethylquinacridone
(g) 13.2 parts of (m)
(r) 13.2 parts of (m) + 2% 2-phthalimidomethylquinacridone
(s) 13.2 parts of (m) + 4% 2-phthalimidomethylquinacridone Products (n), (o), and (p) are alpha quinacridone.

When tested by rubout in a lithographic ink product (n) exhibits a very light masstone and a weak tint. Product (o) is darker in masstone and comparable to a pigmentary product in this regard. Product (p) is darker in masstone than product (o).

Products (q), (r) and (s) are beta-quinacridones containing some alpha quinacridone. Product (q) is very light in masstone and weak in tint. Product (r) is substantially stronger in tint and darker in masstone and is comparable to commercial products. Product (s) is darker in masstone than product (r) equal in strength but somewhat yellow due to a greater amount of alpha quinacridone crystallographic impurity.

I claim:
1. A process of preparing pigmentary grade quinacridone from crude quinacridone consisting essentially of a quinacridone or mixture of quinacridones of the formula

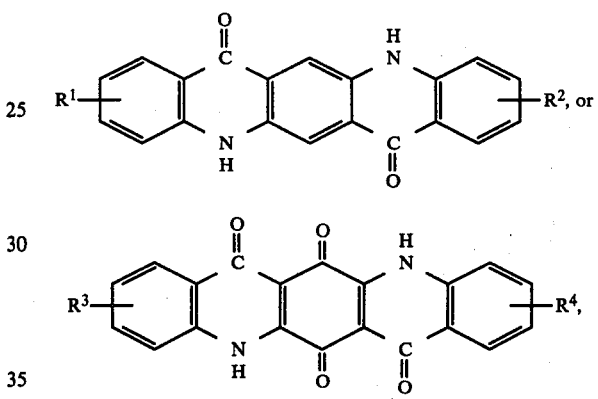

and mixtures thereof, with 0 to 75 weight percent of unsubstituted quinacridone and 0 to 15 wt. % of a quinacridone of the formula

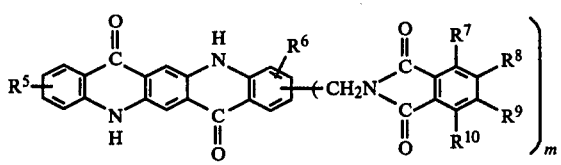

where $R^1$, and $R^2$ are fluorine, chlorine, bromine, methyl or methoxy; $R^7$, $R^9$, and $R^{10}$ are hydrogen or chlorine; $R^3$, $R^4$, $R^5$, and $R^6$ are hydrogen, fluorine, chlorine, bromine, methyl, or methoxy; and $R^8$ is hydrogen, chlorine, bromine, nitro, alkyl groups of 1 to 5 carbon atoms, alkoxy groups of 1 or 2 carbon atoms or benzoylamino, and m is an integer of from 1 to 4 by converting the crude quinacridone to a low crystallinity aggregated form, followed by milling the low crystallinity quinacridone in a water miscible organic liquid which is effective in improving the crystallinity of quinacridone particles containing up to an equal amount of water present in an amount sufficient to give a fluid slurry and recovering a pigmentary product.

2. The process of claim 1 wherein the aggregated low crystallinity quinacridone composition is prepared by dissolving crude quinacridones as defined in claim 1 in concentrated sulfuric acid followed by drowning the solution in water to precipitate an aggregated low crystallinity quinacridone composition.

3. The process of claim 1 wherein the aggregated low crystallinity quinacridone is prepared by dry ball milling a crude quinacridone or crude quinacridones as defined in claim 1.

4. The process of claim 3 wherein the liquid is a lower alcohol or ketone.

5. The process of claim 4 wherein the organic liquid is acetone.

6. The process of claim 5 wherein the quinacridone is 2,9-dimethylquinacridone and up to 5% by weight phthalimidomethylquinacridone.

7. The process of claim 5 wherein the quinacridone consists essentially of 2,9-dichloroquinacridone containing 0 to 5% by weight phthalimidomethylquinacridone.

8. The process of claim 5 wherein the quinacridone is a solid solution consisting essentially of 2,9-dichloroquinacridone, quinacridone and 0 to 5% by weight phthalimidomethylquinacridone.

9. The process of claim 5 wherein the quinacridone is a solid solution consisting essentially of 2,9-dimethylquinacridone, quinacridone and 0 to 5% by weight phthalimidomethylquinacridone.

10. The process of claim 5 wherein the quinacridone is a solid solution consisting essentially of quinacridone, dihydroquinacridone, 4,11-dichloroquinacridone, and quinacridonequinone.

11. The process of claim 5 wherein the quinacridone is a solid solution consisting essentially of quinacridonequinone and anilinoacridone.

* * * * *